US007600964B2

(12) United States Patent
Rogall et al.

(10) Patent No.: US 7,600,964 B2
(45) Date of Patent: Oct. 13, 2009

(54) WIND POWER PLANT AND ARRANGEMENT OF BEARINGS THEREFOR

(75) Inventors: Peter Rogall, Emsbüren (DE); Martin Eilting, Rheine (DE)

(73) Assignee: General Electric Company, Schenectady, NY (US)

( * ) Notice: Subject to any disclaimer, the term of this patent is extended or adjusted under 35 U.S.C. 154(b) by 141 days.

(21) Appl. No.: 10/521,615

(22) PCT Filed: Jul. 15, 2003

(86) PCT No.: PCT/EP03/07648

§ 371 (c)(1),
(2), (4) Date: Feb. 9, 2006

(87) PCT Pub. No.: WO2004/007954

PCT Pub. Date: Jan. 22, 2004

(65) Prior Publication Data

US 2006/0153675 A1    Jul. 13, 2006

(30) Foreign Application Priority Data

Jul. 15, 2002   (DE) ................................ 102 31 948

(51) Int. Cl.
*F04D 29/08* (2006.01)
(52) U.S. Cl. ..................... 415/4.5; 415/118; 415/122.1; 415/170.1; 415/908
(58) Field of Classification Search .................. 415/4.5, 415/118, 122.1, 170.1, 908; 290/55, 44
See application file for complete search history.

(56) References Cited

U.S. PATENT DOCUMENTS 4,757,211 A    7/1988  Kristensen

| 4,871,923 | A | * | 10/1989 | Scholz et al. | 290/55 |
| 5,663,600 | A | * | 9/1997 | Baek et al. | 290/55 |
| 6,232,673 | B1 | * | 5/2001 | Schoo et al. | 290/55 |
| 6,452,287 | B1 | * | 9/2002 | Looker | 416/4 |
| 6,459,165 | B1 | | 10/2002 | Schoo | |
| 6,504,260 | B1 | * | 1/2003 | Debleser | 290/44 |

(Continued)

FOREIGN PATENT DOCUMENTS

AT              403189 B       11/1997

(Continued)

OTHER PUBLICATIONS

German Patent dated Jan. 26, 2007 (3 pages).

(Continued)

*Primary Examiner*—Igor Kershteyn
(74) *Attorney, Agent, or Firm*—James W. Pemrick; Ernest G. Cusick; Frank A. Landgraff

(57) ABSTRACT

A wind power plant is provided having a rotor which is rotatably supported with respect to a rotor axis by a bearing arrangement. A rotor blade is fixed to a rotor hub and extends therefrom radially outwardly, with respect to the rotor axis. The bearing arrangement includes a first bearing ring fixed to a support arrangement in a torque-proof manner and disposed coaxially with respect to the rotor axis, and a second bearing ring being rotatably, with respect to the rotor axis, supported on the first bearing ring and fixed to the rotor hub.

15 Claims, 3 Drawing Sheets

U.S. PATENT DOCUMENTS

| | | |
|---|---|---|
| 6,759,758 B2 | 7/2004 | Torres Martinez |
| 6,774,504 B1 | 8/2004 | Lagerwey |
| 7,161,259 B2 | 1/2007 | Lagerwey |

FOREIGN PATENT DOCUMENTS

| | | | |
|---|---|---|---|
| DE | 734147 | | 4/1943 |
| DE | 4103151 | A1 | 8/1992 |
| DE | 4432986 | A1 | 11/1995 |
| DE | 19916453 | A1 | 10/2000 |
| DE | 19916454 | A1 * | 10/2000 |
| DE | 10015287 | A1 | 10/2001 |
| DE | 10102255 | A1 | 1/2002 |
| DE | 10392908 | B4 | 10/2005 |
| EP | 1045139 | B1 | 8/2005 |
| ES | 2206028 | A1 * | 5/2004 |
| WO | 9610130 | A1 | 4/1996 |
| WO | 0107784 | A1 | 1/2001 |
| WO | 0121956 | A1 | 3/2001 |

OTHER PUBLICATIONS

German Patent dated Apr. 9, 1943, Reichspatentamt, Patentschrift; No. 734147 (4 pages).
German Patent, Patentschrift, No. AT 403 189 B (6 pages).
German Patent, Offenlegungsschrift, No. DE 44 32 986 Al (6 pages).
John L. Collins et al., "Experience and Assessment of the DOE-NASA Mod-1 2000-Kilowatt Wind Turbine Generator at Boone, North Carolina", DOE/NASA/20366-2 NASA TM-82721, Apr. 1982, p. 1-54, U.S. Department Of Energy, Conservation and renewable Energy Division of Wind Energy Systems.
European Commission - General Directorate of Energy, Wind Energy Converter HSW 250, Final Report Published In The Monthly Magazine "Euro Abstracts", 1994, p. 1-99, ISBN 92-826-7089-9, Office for Official Publications of the European Communities, Luxemburg.
Author Unknown, HSW Kommt Grob Raus, Windkraft Journal, Mar. 1993, 14-15, 32, Issue No. 1/93, Verlag Naturliche Energie, Germany.
Lagerwey GMBH, Lagerwey Brochure, Catalog, Date Unknown, p. 1-6, Vol.-Issue No. Unknown, Lagerwey GmbH, Germany.
Author Unknown, Lagerwey Holland 750kW, Windkraft Journal, Apr. 1996, p. 14-17, vol.-Issue No. 4/96, Verlag Naturliche Energie, Germany.

* cited by examiner

WIND POWER PLANT AND ARRANGEMENT OF BEARINGS THEREFOR

CROSS-REFERENCE TO OTHER APPLICATIONS

This application is a National Phase Application of International Application No. PCT/EP2003/007648, filed Jul. 15, 2003, which claims priority from German Patent Application No. 102 31 948.0, filed Jul. 15, 2002.

BACKGROUND OF THE INVENTION

The present invention relates to a wind power plant having a rotor being rotatably mounted with respect to a rotor axis by means of a bearing arrangement and having at least one rotor blade attached to a rotor hub and extending therefrom radially in an outward direction with respect to the rotor axis, as well as a bearing arrangement for such a wind power plant.

Typically, wind power plants of the above described type have a tower with a rotor being mounted at the top of said tower and being rotatably run on bearings about a rotation axis extending substantially in a horizontal direction. For adjusting the wind power plant to the wind conditions, usually the rotor together with the bearing arrangement can be rotated about a rotation axis extending in a pivoting direction. To this end, the bearing arrangement, the rotor, a gear coupled to the rotor (if provided), and a generator coupled to the gear at the output end are disposed on a platform rotatably mounted on the top of the tower. In modern wind power plants having a nominal power of several megawatts, the rotor may have a diameter of more than 100 m. In these wind power plants, the torque is typically applied to the generator by means of a rotor shaft screwed to the rotor hub via a flange. The rotor shaft intersperses a bearing block disposed on the platform which is rotatable about the vertical rotation axis, and its end opposite to the rotor hub is counterbeared via a clamping set to the input of a gear, the output of said gear being coupled to the generator.

During long-term operation of wind power plants of the above described type is turned out that crack initiation occurred in the rotor shafts typically being formed as hollow shafts, so that replacement of the rotor shaft is necessitated to prevent breakage thereof and, as a consequence thereof, the risk of a rotor crash.

In view of these problems associated with the prior art, it is an object of the present invention to provide a wind power plant of the previously described type which allows for low-maintenance long-term operation as well as to provide a bearing arrangement for such a wind power plant.

According to the present invention, this object is solved by an improved wind power plant of the previously described type which is essentially characterized in that the bearing arrangement comprises a first bearing ring being fixed to a support arrangement in a torque proof manner, with respect to the rotor axis, and being disposed coaxially with the rotor axis, as well as a second bearing ring being also disposed coaxially with the rotor axis but being supported on the first bearing ring in a rotatable manner, with respect to the rotor axis, and being fixed to the rotor hub.

This invention is based on the insight that the deficiencies observed during operation of the known wind power plants are primarily due to the fact that not only torque is transferred by the rotor shaft but also every other load like, e.g., the weight of the rotor comprised of the rotor hub and the rotor blades, and operational shearing or tilting moments are applied thereto. In contrast to this, in the wind power plant according to the present invention, the gravitational forces and operational shearing or tilting moments are transferred by the first bearing ring whereas the second bearing ring and a torque transmission arrangement being attached thereto where required, have only to bear the torque. Thus, damage due to loads of the second bearing ring and/or a torque transmission arrangement being coupled thereto where required, can be avoided even during long-term operation of the wind power plant.

Even though also the use of gearless wind power plants with synchronous generators where the second bearing ring is directly coupled to the generator, is within the scope of the present invention, is turned out to be especially beneficial for an increase in efficiency that the rotor is coupled to the input of a gear box which can be coupled to a generator at its output side.

Especially, in the previously described embodiment of the present invention it proved to be favorable with respect to the above-mentioned load distribution that the wind power plant according to the present invention has a torque transmission arrangement extending, when starting from the second bearing ring preferably directly mounted to the rotor hub, radially inwardly with respect to the rotor axis.

In modern wind power plants, the rotor blades are mounted to the rotor hub so that they can rotate about their longitudinal axis for adjustment to the actual wind conditions. To this end, normally pitch drives are provided in the rotor hub which is in general formed as a casting. The pitch drives can cause the rotor blades to rotate about their longitudinal axis. Additionally or alternatively, aerodynamical tools can be provided like, e.g., adjustable rotor blade tips and/or rotor blade flaps which can be adjusted by drives accommodated in the rotor hub. To this end, the rotor hub is normally formed as a hollow body.

For facilitating of maintenance of such wind power plants, it proved to be especially favorable if the torque transmission arrangement extending, when starting from the second bearing ring preferably directly mounted to the rotor hub, radially inwardly with respect to the rotor axis has at least one passage opening allowing for access to the interior of the rotor hub because, thus, the drives accommodated in the hub are accessible from the platform or a nacelle formed thereon in an especially easy way. Thereby, access may occur independently from a respective position of the rotor. Further facilitation of access to the elements of the wind power plat which are accommodated in the rotor hub is achieved if the torque transmission arrangement has a spoke wheel with two, three or more passage openings and fixed to the second bearing ring.

As a result, access to the rotor hub is provided independent of atmospheric influence.

From a design aspect, the bearing arrangement of a wind power plant according to the present invention can be realized especially simple by a roller bearing, the outer ring (inner ring) thereof being formed by the first bearing ring and the inner ring (outer ring) thereof being formed by said second bearing ring.

As mentioned before, in a wind power plant according to the present invention the first bearing ring, which is fixed to the support arrangement in a torque-proof manner, bears the gravitational forces as well as operational shearing and tilting moments. Thereby, damage due to the forces applied to the support arrangement can be reliably prevented by a support arrangement having a sandwich structure with an inner support layer and an outer support layer, inner and outer being defined with respect to the rotor axis, and a filling layer disposed between said support layers. Thus, an especially high stiffness of the support arrangement is achieved, wherein the occurring shear forces can be absorbed by the filling layer disposed between the support layers.

For reducing the weight of the support arrangement, it proved appropriate that at least one of said support layers is formed as a tubular construction. The filling layer may comprise spacer for ensuring the spacing between the support layers, a honeycomb structure, polyurethane foam, metallic foam and/or a balsa core. Further to providing high stiffness and reduced weight, the support arrangement according to the present invention also provides noise insulation and excellent vibration damping. The transmission of force into the support arrangement can be accomplished via a bending resistant front flange of the support arrangement which is fixed to the first bearing ring.

As has been explained above, at least one rotor blade of the wind power plant according to the present invention may be fixed to the rotor hub so that it can be rotated about its longitudinal axis to thereby improve the efficiency of the wind power plant for varying wind conditions.

Although a complete housing of the single components of a wind power plant according to the present invention is not longer necessary when the support arrangement is formed as a tubular construction, it turned out to be of advantage in view of further efficiency improvement that at least the rotor hub is surrounded by a covering element at least in part.

BRIEF SUMMARY OF THE INVENTION

As is apparent from the above description of wind power plants according to the present invention, a bearing arrangement for such a wind power plant is essentially characterized in that it comprises a first bearing ring being fixed to a support arrangement in a torque-proof manner, and a second bearing ring being rotatably supported on the first bearing ring and being fixed to a rotor hub bearing at least one rotor blade.

In the following, the present invention will be explained with reference to the drawings to which reference is also made regarding details essential to the invention but not explicitly described in the description.

DETAILED DESCRIPTION OF THE INVENTION

Figure 1:
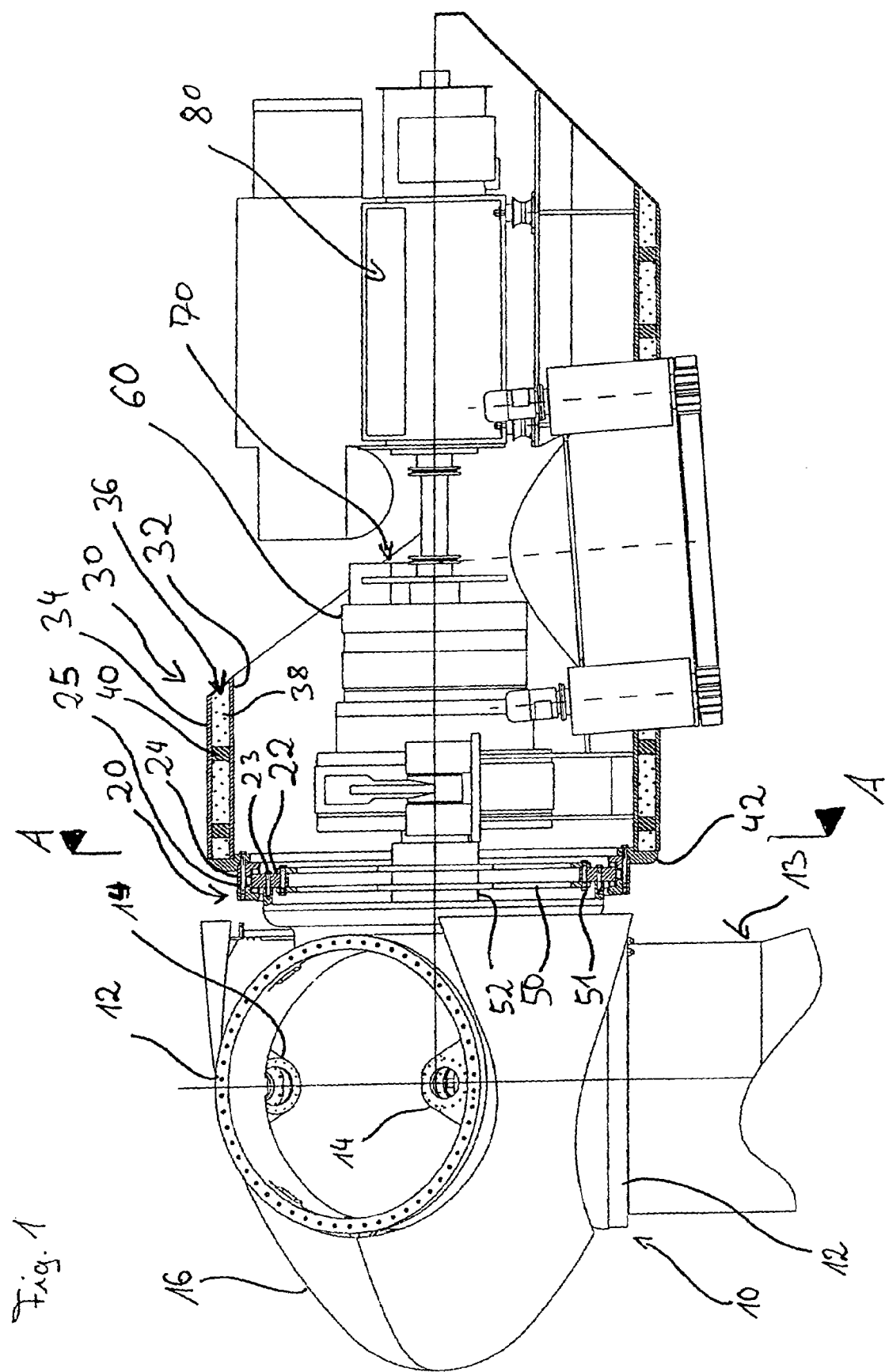
FIG. 1 shows a schematic drawing of a first embodiment of a wind power plant according to the present invention.
Figure 3:
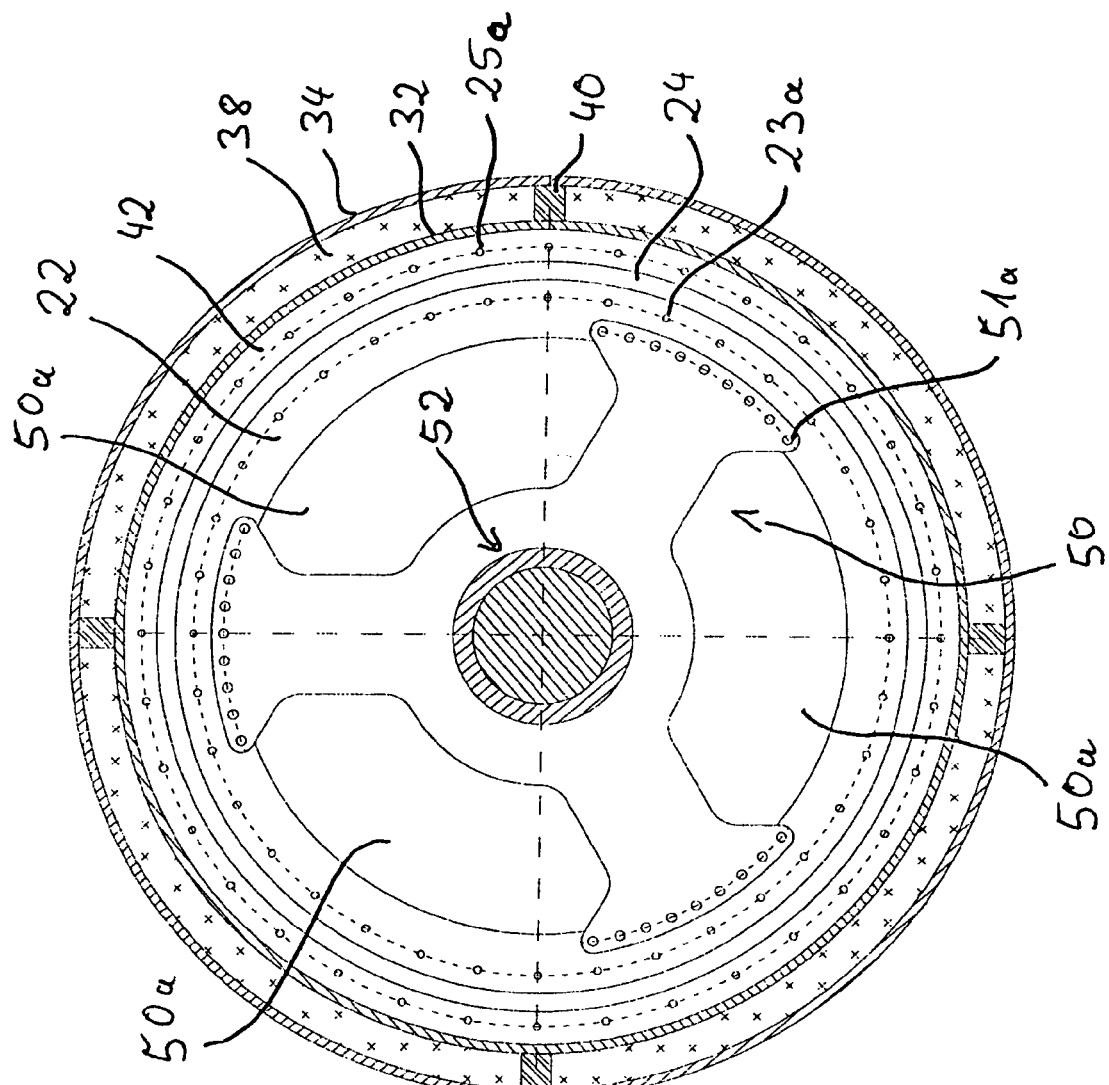
FIG. 3 shows a radial sectional view of the wind power plant shown in FIG. 1 along the section indicated by A-A in FIG. 1.

FIGS. 1 and 3 show a rotor hub 10, a bearing arrangement 20 for rotatably bearing rotor hub 10, a support arrangement 30, a gear 60 and a generator 80 of a wind power plant according to the present invention.

Rotor hub 10 is formed as a casting and comprises three mounting collars 12 for mounting rotor blades 13, only one of said rotor blades being shown in FIG. 1. By virtue of these mounting collars 12, the rotor blades 13 can be fixed to the rotor hub 10 in a manner so that they can be rotated about their longitudinal axis. Respective drives are disposed in the rotor hub 10 for rotating the rotor blades, wherein the drives can be fixed to drive supports 14 mounted in the rotor hub. In the embodiment according to the present invention shown in FIG. 1, such a drive mountable to a corresponding drive support 14 is provided for each rotor blade. However, it is also within the scope of the present invention to use wind power plants where the rotor blades are rotated by a single drive. A covering element 16 partially surrounding the rotor hub is provided for improving aerodynamical properties and noise reduction.

The bearing arrangement 20 serving for rotatably bearing the rotor hub is realized as a live ring and substantially comprises an inner bearing ring 22 and an outer bearing ring 24, wherein said bearing rings are positioned coaxially with the rotor axis and are supported by bearing supports so that they are rotatable against each other about the rotor axis. In the embodiment of the present invention shown in FIG. 1, the inner bearing ring 22 is fixed to the rotor hub 10 by screws 23 interspersing said inner bearing ring 22, whereas the outer bearing ring 24 is fixed to a bending resistant front flange 42 of support arrangement 30 by means of such interspersing screws 25. Due to this bearing arrangement, the weight of the rotor hub as well as operational shearing and tilting moments are absorbed by the outer bearing ring 24, whereas torque is transmitted via inner bearing ring 22. The inner diameter of inner bearing ring 22 is determined so that the maintenance staff has access to the interior of rotor hub 10 via inner bearing ring 22.

In the embodiment of the present invention shown in the drawing, support arrangement 30 is formed as a sandwich structure with an inner support layer 32, an outer support layer 34 and a filling layer 36, wherein support layers 32 and 34 are realized as tubular constructions to achieve high stiffness at low weight. Filling layer 36 comprises a filler like, e.g., a balsa core, polyurethane foam or a honeycomb structure as well as spacers 40 for maintaining a distance between the inner support layer 32 and the outer support layer 34. The bending resistant front flange 42 is mounted on the front end side of support arrangement 30 facing rotor hub 10, said front flange being screwed to outer bearing ring 24.

In the embodiment of the present invention shown in FIG. 1, the inner bearing ring 22 is coupled to the input of a gear 60 via a spoke wheel 50 fixed to inner bearing ring 22 by screws 51 and a shaft 52, the output of said gear being coupled to a generator 80 via a clutch with an integrated wheel disk brake 70. As is apparent from FIG. 3, spoke wheel 50 comprises three passage openings 50a for allowing access to the interior of rotor hub 10.

According to FIG. 3, inner support layer 32 and outer support layer 34 as well as filler 38 are disposed coaxially with respect to the rotor axis. The same applies to the bending resistant front flange 42 having recesses 25a interspersed by screws 25 which are arranged on a circle extending coaxially with the rotor axis. Also, inner bearing ring 22 is interspersed by a number of recesses 23a for accepting screws 23, said recesses being arranged on a circle extending coaxially with the rotor axis. Likewise, the spokes of spoke wheel 50 are interspersed by recesses 51a at their outer periphery, said recesses being designed for accepting screws 51.

Figure 2:
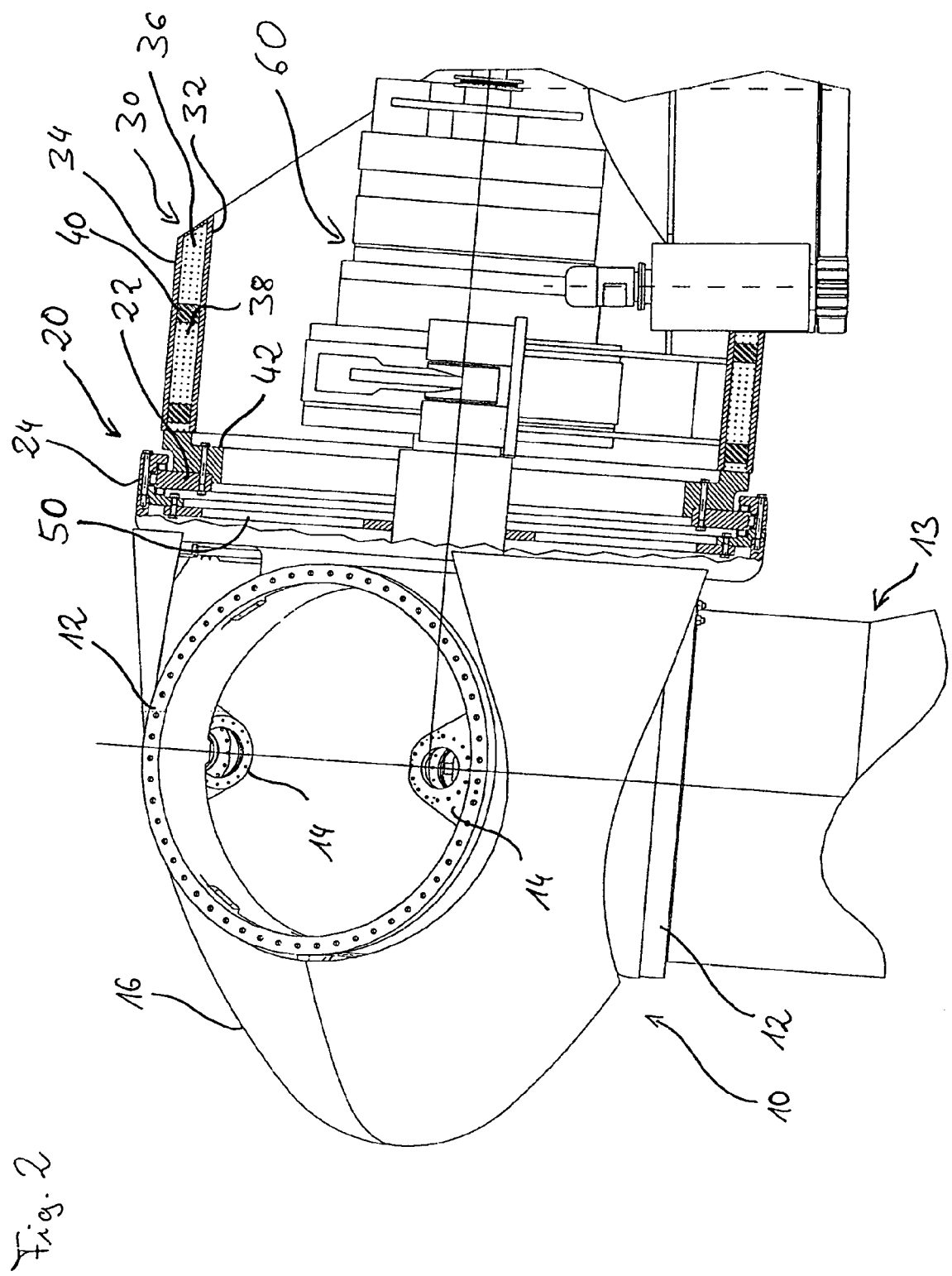
FIG. 2 shows a second embodiment of a wind power plant according to the present invention.

The embodiment of the present invention shown in FIG. 2 differs from the embodiment explained with reference to FIGS. 1 and 3 only in that the rotor hub 10 is fixed to outer bearing ring 24 of the bearing arrangement 20 formed as a live ring, whereas inner bearing 22 is fixed to the bending resistant front flange 42 of support arrangement 30.

The invention is not restricted to the embodiments shown in the drawings. Rather, also the use of wind power plants with more or less than three rotor blades is intended. Also, the connection between the bearing arrangement and the gear can be realized different from the embodiments shown in the drawings. Especially, the use of gearless wind power plants is intended. Further to this, the second bearing ring can be formed integrally with the rotor hub. Finally, upgrading of existing wind power plants is within the scope of the present invention. A bearing arrangement capable of such an upgrading comprises a first bearing ring being fixable to a support arrangement of a wind power plant in a torque-proof manner, and a second bearing ring being rotatably supported on the first bearing ring and fixed to a rotor hub having at least one rotor blade.

The invention claimed is:

1. A wind power plant having a rotor which is rotatably supported with respect to a rotor axis by means of a bearing arrangement and has a rotor blade fixed to a rotor hub and extending therefrom radially outwardly, with respect to the rotor axis, characterized in that said bearing arrangement comprises a first bearing ring being fixed to a support arrangement in a torque-proof manner and disposed coaxially with respect to said rotor axis, and a second bearing ring being rotatably, with respect to said rotor axis, supported on said first bearing ring and fixed to said rotor hub,
further comprising a torque transmission arrangement extending radially inwardly with respect to the rotor axis from the second bearing ring, and
wherein the torque transmission arrangement has at least one passage opening allowing access to the interior of the rotor hub.

2. The wind power plant according to claim 1, wherein the rotor is coupled to the input of a gear arrangement which can be coupled to a generator at its output end.

3. The wind power plant according to claim 1, wherein the torque transmission arrangement comprises a spoke wheel fixed to said second bearing ring, said spoke wheel having two, three or more passage openings.

4. The wind power plant according to claim 1, wherein the first bearing ring is the outer ring or inner ring of a roller bearing, the inner ring or outer ring of said roller bearing being formed by said second bearing ring, respectively.

5. The wind power plant according to claim 1, wherein said support arrangement is formed as a sandwich structure having an inner support layer and an outer support layer, said inner and outer layers being defined with respect to said rotor axis, and a filling layer disposed between said support layers.

6. The wind power plant according to claim 5, wherein at least one of said support layers comprises a tubular construction.

7. The wind power plant according to claim 5, wherein the filling layer comprises at least one spacer, a honeycomb structure, polyurethane foam, metallic foam and/or a balsa core.

8. The wind power plant according to claim 1, wherein the first bearing ring is fixed to the support arrangement via a bending resistant front flange.

9. The wind power plant according to claim 1, wherein at least one rotor blade is fixed to the rotor hub in a manner so that it can be rotated about its longitudinal axis.

10. The wind power plant according to claim 1, wherein a covering element which at least partially surrounds the rotor hub.

11. The wind power plant according to claim 1, having a first bearing ring being fixed to a support arrangement in a torque-proof manner and a second bearing ring being rotatably supported on said first bearing ring and fixed to a rotor hub supporting at least one rotor blade.

12. A wind power plant having a rotor which is rotatably supported with respect to a rotor axis by means of a bearing arrangement and a rotor blade fixed to a rotor hub and extending therefrom radially outwardly, with respect to the rotor axis, characterized in that said bearing arrangement comprises a first bearing ring being fixed to a support arrangement in a torque-proof manner and disposed coaxially with respect to said rotor axis, and a second bearing ring being rotatably, with respect to said rotor axis, supported on said first bearing ring and fixed to said rotor hub, said wind power plant comprising:
a torque transmission arrangement extending radially inwardly with respect to the rotor axis from the second bearing ring, said torque transmission arrangement comprising at least one passage opening allowing access to an interior of said rotor hub; and
wherein, due to this bearing arrangement, the weight of the rotor hub as well as operational shearing and tilting moments are substantially absorbed by the first bearing ring, whereas torque is transmitted via said second bearing ring and said torque transmission arrangement.

13. The wind power plant according to claim 12, wherein said torque transmission arrangement comprises a spoke wheel fixed to said second bearing ring, said spoke wheel having one or more passage openings.

14. A wind power plant having a rotor rotatably supported with respect to a rotor axis by means of a bearing arrangement and a rotor blade fixed to a rotor hub and extending therefrom radially outwardly, with respect to the rotor axis, said wind power plant comprising:
a bearing arrangement comprising a first bearing ring fixed to a support arrangement in a torque-proof manner and disposed coaxially with respect to said rotor axis, and a second bearing ring rotatably supported on said first bearing ring and fixed to said rotor hub;
a torque transmission arrangement extending radially inwardly with respect to the rotor axis from the second bearing ring;
wherein said torque transmission arrangement comprises at least one passage opening allowing access to an interior of said rotor hub; and
wherein, said first bearing ring is configured to substantially rotate against said second bearing ring.

15. The wind power plant according to claim 14, wherein said torque transmission arrangement comprises a spoke wheel fixed to said second bearing ring, said spoke wheel having one or more passage openings.

* * * * *